US008444355B2

(12) United States Patent
Gaudron et al.

(10) Patent No.: US 8,444,355 B2
(45) Date of Patent: May 21, 2013

(54) ANCHOR STUD AND METHOD OF FORMING AN ANCHOR STUD

(75) Inventors: Paul Gaudron, Stratford, CT (US); Jacob Olsen, Roselle, IL (US)

(73) Assignee: Black & Decker Inc., Newark, DE (US)

( * ) Notice: Subject to any disclaimer, the term of this patent is extended or adjusted under 35 U.S.C. 154(b) by 592 days.

(21) Appl. No.: 12/647,023

(22) Filed: Dec. 24, 2009

(65) Prior Publication Data
US 2010/0135743 A1 Jun. 3, 2010

(51) Int. Cl.
*F16B 13/06* (2006.01)

(52) U.S. Cl.
USPC ............... 411/60.1; 411/37; 411/44; 411/55; 411/72

(58) Field of Classification Search
USPC ............... 411/18, 24, 27, 37, 44, 57.1, 60.1, 411/71, 72
See application file for complete search history.

(56) References Cited

U.S. PATENT DOCUMENTS

| | | | |
|---|---|---|---|
| 3,171,322 A * | 3/1965 | Kaplan | 411/60.1 |
| 3,855,896 A | 12/1974 | Kaufman | |
| 4,100,834 A | 7/1978 | Harris | |
| 4,636,123 A | 1/1987 | Herb | |
| 4,656,806 A | 4/1987 | Leibhard et al. | |
| 4,764,055 A | 8/1988 | Clark et al. | |
| 4,861,197 A | 8/1989 | Calandra, Jr. | |
| 4,904,135 A | 2/1990 | Barthomeuf et al. | |
| 5,176,481 A | 1/1993 | Schiefer | |
| 5,178,502 A * | 1/1993 | Sadri | 411/361 |
| 5,284,409 A | 2/1994 | Miyanaga | |
| 5,690,455 A | 11/1997 | Fischer et al. | |
| 5,707,190 A | 1/1998 | Hiraguri et al. | |
| 6,827,535 B2 * | 12/2004 | Fuchs et al. | 411/44 |
| D548,579 S | 8/2007 | Gaudron | |
| 7,465,128 B2 | 12/2008 | Bruneau | |
| 7,587,873 B2 | 9/2009 | Mcsherry et al. | |
| D615,392 S | 5/2010 | Gaudron et al. | |
| D615,855 S | 5/2010 | Gaudron et al. | |
| 7,722,295 B2 | 5/2010 | Cook | |
| 7,744,320 B2 | 6/2010 | Kobetsky et al. | |
| 7,857,564 B2 * | 12/2010 | Wieser et al. | 411/60.1 |
| 8,002,506 B2 * | 8/2011 | Pourtier et al. | 411/57.1 |
| 8,192,122 B2 | 6/2012 | Gaudron et al. | |
| 2002/0054805 A1 * | 5/2002 | Kaibach et al. | 411/60.1 |
| 2002/0106256 A1 * | 8/2002 | Kaibach et al. | 411/60.1 |
| 2003/0123948 A1 * | 7/2003 | Fuchs et al. | 411/60.1 |
| 2004/0096288 A1 * | 5/2004 | Haug et al. | 411/57.1 |
| 2008/0050195 A1 * | 2/2008 | Wieser et al. | 411/44 |
| 2010/0111639 A1 | 5/2010 | Gaudron | |
| 2010/0135743 A1 | 6/2010 | Gaudron et al. | |
| 2010/0143067 A1 | 6/2010 | Gaudron | |

OTHER PUBLICATIONS

Europen Search Report, Application No. 10197009.3-2424, dated Mar. 24, 2011, 4 pages.

* cited by examiner

Primary Examiner — Roberta Delisle
(74) Attorney, Agent, or Firm — Scott B. Markow

(57) ABSTRACT

An anchor stud includes a stud portion including a body portion having a first end that extends to a second end though an intermediate portion. A wedge member is operatively coupled to the second end of the stud portion. The wedge member includes a body having a generally frustoconical profile and is formed from a material having a Vickers hardness of between about 218 HV and about 290 HV. A sleeve element is positioned on the stud portion at the second end adjacent the wedge member. The sleeve element is formed from a material having a Vickers hardness of between about 218 HV and about 290 HV.

24 Claims, 1 Drawing Sheet

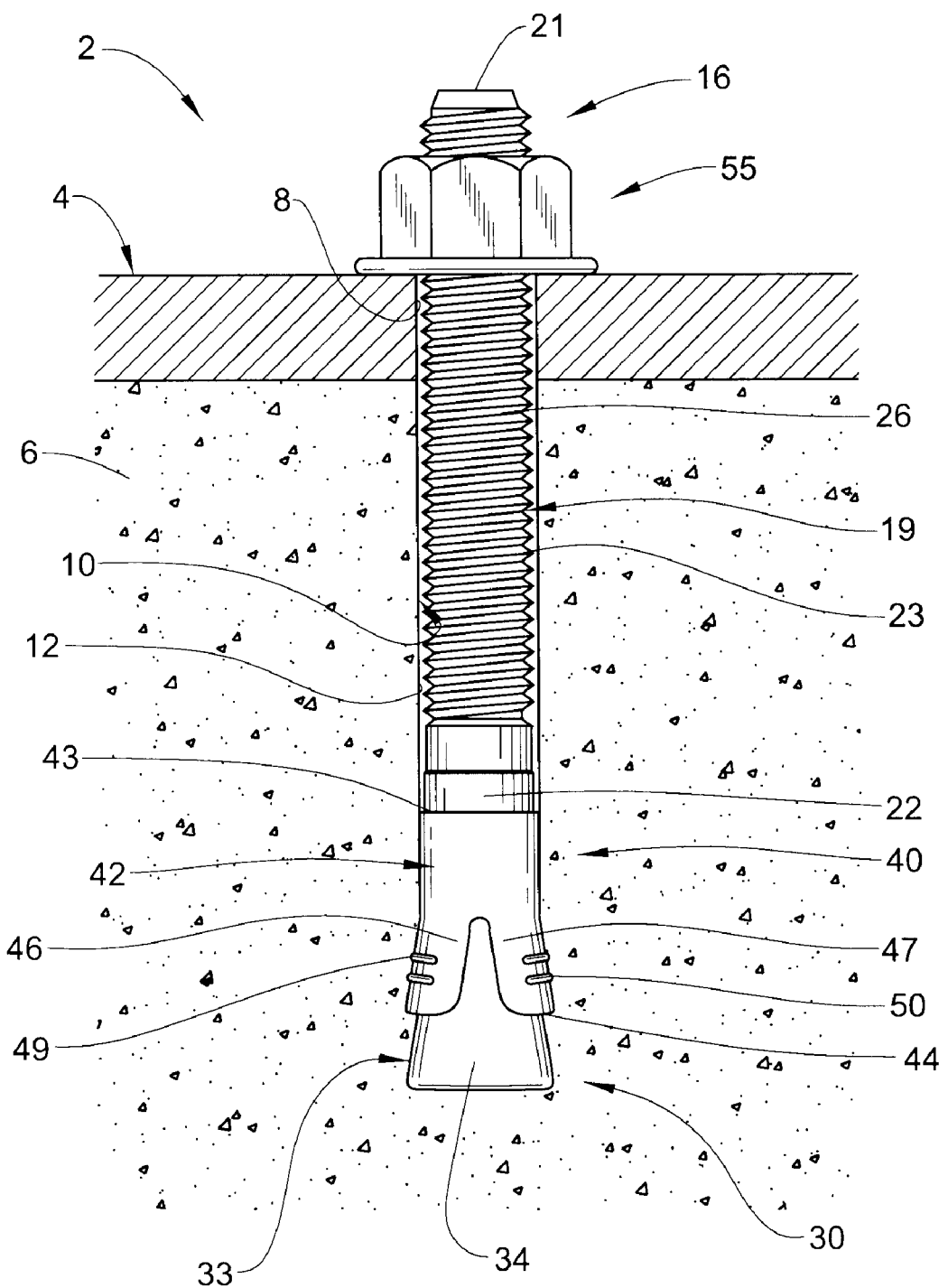

ANCHOR STUD AND METHOD OF FORMING AN ANCHOR STUD

BACKGROUND OF THE INVENTION

The subject matter disclosed herein relates to the art of mechanical fasteners and, more particularly, to an anchor stud for attaching objects or structures to a base material.

An anchor stud is typically used to attach objects or structures to a base material. A typical anchor stud includes a stud, a tapered mandrel or wedge and a clip or sleeve portion. In use, a hole having a diameter that is only slightly larger than the wedge and the sleeve is drilled or otherwise formed in the base material. The size of the hole allows passage of the wedge and the sleeve, while still providing some measure of friction. That is, once inserted into the hole, a nut is rotated onto the anchor stud causing the wedge to be drawn into the sleeve. As the wedge moves along an axis of the hole, the sleeve expands into contact with side portions of the hole. Upon expansion of the sleeve, however, the material thickness of the sleeve is interposed between the wedge and the base material. This effectively increases the diameter of the wedge by roughly twice the thickness of the sleeve. Since the hole diameter in the base material does not change appreciably due to the expansion input, the anchor stud becomes substantially permanently anchored in the base material.

Both function and longevity of such anchor stud rely, in large part, on the properties of the sleeve portion. More specifically the material forming the sleeve must be durable enough to provide suitable anchoring capability and reasonable life particularly in concrete structures that, during their service life, are subject to cracking. Heretofore, the only material deemed acceptable by the art for concrete structures subject to cracking has been stainless steel. While this material is quite appropriate for the task its cost factor is difficult to absorb. Since economic considerations are important in nearly all industries, the art is always receptive to alternative configurations.

In addition to cost considerations, components made of dissimilar metals will, over time when exposed to the elements, experience degradation caused by galvanic corrosion. The galvanic corrosion typically occurs at contact points or interface zones between the components. In addition, stress corrosion cracking will occur as a result of a combination of mechanical loading and chemical attack. More specifically, stress corrosion cracking results from a particular material condition, particular (specific) attacking media, and tensile stresses. When used in concrete, which typically includes calcium chloride, sulfite, aluminum chloride, and other chemicals, mechanical fasteners made from stainless steel are prone to stress corrosion cracking. Stress corrosion cracking is exacerbated on highly cold worked stainless steel. Such cracking is hard to detect on exposed parts and is all but impossible to detect when used in a hole drilled in concrete.

BRIEF DESCRIPTION OF THE INVENTION

According to one aspect of the invention, an anchor stud includes a stud portion including a body portion having a first end that extends to a second end though an intermediate portion. A wedge member is operatively coupled to the second end of the stud portion. The wedge member includes a body having a generally frustoconical profile and is formed from a material having a Vickers hardness of between about 218 HV and about 290 HV. A sleeve element is positioned on the stud portion at the second end adjacent the wedge member. The sleeve element is formed from a material having a Vickers hardness of between about 218 HV and about 290 HV.

According to another aspect of the invention, an anchor stud includes a stud portion including a body portion having a first end that extends to a second end though an intermediate portion. A wedge member is operatively coupled to the second end of the stud portion. The wedge member is formed from a hypoeutectic steel having a Vickers hardness of between about 218 HV and about 290 HV. A sleeve element is positioned on the stud portion at the second end adjacent the wedge member. The sleeve element is formed from a hypoeutectic steel having a Vickers hardness of between about 218 HV and about 290 HV.

According to yet another aspect of the invention, a method of forming an anchor stud includes forming a stud portion including a body portion having a first end that extends to a second end though an intermediate portion, providing a wedge member formed from a hypoeutectic steel having a Vickers hardness of between about 218 HV and about 290 HV at the second end of the stud portion, and attaching a sleeve element formed from a hypoeutectic steel having a Vickers hardness of between about 218 HV and about 290 HV to the stud portion at the second end portion adjacent the wedge member.

These and other advantages and features will become more apparent from the following description taken in conjunction with the drawings.

BRIEF DESCRIPTION OF THE FIGURES

The following descriptions should not be considered limiting in any way. With reference to the accompanying drawings, wherein like reference numbers identify corresponding components in the respective views in which:

FIG. 1 is a side view of an anchor stud in accordance with an exemplary embodiment.

The detailed description explains embodiments of the invention, together with advantages and features, by way of example with reference to the drawings.

DETAILED DESCRIPTION OF THE INVENTION

A detailed description of the hereinafter described embodiments of the disclosed apparatus and method are presented herein by way of exemplification and not limitation with reference to the Figures.

An anchor stud in accordance with an exemplary embodiment is indicated generally at 2. Anchor stud 2 is shown securing an object, such as a steel plate 4 to a structure, shown as a concrete wall 6. More specifically, and as will be detailed more fully below, anchor stud 2 extends through a hole 8 formed in steel plate 4 into a bore 10 formed in concrete wall 6. Anchor stud 2 is configured to engage a side wall portion 12 of bore 10 to secure steel plate 4 to concrete wall 6. Of course it should be understood that while shown retaining a steel plate to a concrete wall, anchor stud 2 can be employed in a wide variety of applications. Moreover, the particular construction described below allows anchor stud 2 to be certified for use in concrete members that, during their service life, are subject to cracking.

In accordance with an exemplary embodiment, anchor stud 2 includes a stud portion 16 having a body portion 19 including a first end 21 that extends to a second end 22 through an intermediate portion 23. In the embodiment shown, intermediate portion 23 is threaded from first end 21 to a point just short of second end 22. Anchor stud 2 is also shown to include a tapered mandrel or wedge member 30 arranged at second end 22. In accordance with one aspect of the exemplary embodiment, wedge member 30 is integrally formed with stud portion 16. However, it should be understood that wedge member 30 could be formed as a separate element that is operatively joined to stud portion 16. In any event, wedge member 30 includes a body 33 having a frustoconical side portion 34.

In accordance with an exemplary embodiment, wedge member 30 is formed from a hypoeutectic steel having a carbon content less than eutectic steel. In accordance with an aspect of the exemplary embodiment, wedge member 30 is formed from a medium carbon steel from about a 1030 steel to about a 1060 steel. In addition to being formed from hypoeutectic steel, wedge member 30 is hardened to a Vickers hardness (HV) of between about 218 HV and about 290 HV. In accordance with an exemplary aspect, wedge member 30 includes a Vickers hardness of between about 220 HV to about 265 HV. Wedge member 30 can be through hardened or case hardened. In accordance with an exemplary embodiment, wedge member 30 is hardened to a depth of between about 0.005 inches (0.127 mm) and about 0.025 inches (0.635 mm). Of course it should also be understood that hardness can be measured at any depth, from the surface to the core, of wedge member 30.

In further accordance with an exemplary embodiment, anchor stud 2 includes a clip or sleeve element 40 arranged at second end 22 of stud portion 16 adjacent to wedge member 30. Sleeve element 40 includes a body section 42 having a first end section 43 that extends to a second end section 44. Body section 42 is also shown to include first and second wing members 46 and 47 which, as will be discussed more fully below, are forced into side wall portion 12 of bore 10. Towards that end, each wing member 46, 47 includes respective gripping elements 49 and 50 that are configured and disposed to prevent sleeve element 40 from rotating when the anchor stud is tightened as will be detailed more fully below. In the exemplary embodiment shown, sleeve element 40 is formed from a single piece of hypoeutectic steel. However, it should be understood, that sleeve member 40 could be formed from multiple components.

In still further accordance with an exemplary embodiment, sleeve element 40 is formed from a hypoeutectic steel having a carbon content less than eutectic steel. In accordance with an aspect of the exemplary embodiment, sleeve element 40 is formed from a medium carbon steel from about a 1030 steel to about a 1060 steel. In addition to being formed from hypoeutectic steel, sleeve element 40 is hardened to a Vickers hardness (HV) of between about 218 HV and about 290 HV. In accordance with an exemplary aspect, sleeve element 40 includes a Vickers hardness of between about 220 HV to about 265 HV. In accordance with an exemplary embodiment, sleeve element 40 is hardened to a depth of between about 0.005 inches (0.127 mm) and about 0.025 inches (0.635 mm). Of course it should also be understood that hardness can be measured at any depth, from the surface to the core, of sleeve element 40.

In yet further accordance with an exemplary embodiment, wedge member 30 and sleeve member 40 are formed from materials having substantially similar properties and hardness. That is, both wedge member 30 and sleeve element 40 are formed from substantially similar hypoeutectic steel and have substantially similar hardness. By substantially matching carbon content and/or hardness, wedge member 30 is readily drawn into sleeve element 40 without cold welding or galling. More specifically, once anchor stud 2 is positioned within bore 10 and steel plate 4 is installed, a fastener 55 is secured to first end 21 of stud portion 16. As fastener 55 is tightened, stud portion 16 and, by extension wedge member 30 shifts axially relative to sleeve element 40. Continued tightening of fastener 55 draws wedge member 30 further into sleeve element 40 causing first and second wing members 46 and 47 to expand into side wall portion 12 of bore 10. That is, as fastener 55 is tightens, wedge member 30 slides relative to sleeve element 40. Still further tightening of fastener 55 fully secures steel plate 4 to concrete wall 6. Of course it should be understood that anchor stud 2 can also be secured to a structure by itself. That is, attaching steel plate 4 to concrete wall 6 is shown as but one exemplary application, anchor stud 2 can be employed in a wide range of environments and for an unlimited number of applications.

The amount of tightening typically required generates pressure at an interface zone (not separately labeled) between wedge member 30 and sleeve element 40. Under certain circumstances, when using certain materials, the pressure generated by tightening an anchor stud can cause portions of the wedge member to cold weld or gall onto portions of the sleeve member and/or vice versa. When cold welding or galling occurs, the integrity of the anchor stud can be compromised. In order to avoid cold welding or galling, many prior art anchor studs utilize stainless steel.

While effective, using stainless steel adds considerably to the unit cost of the anchor stud. In contrast, the exemplary embodiments described herein utilize materials having a cost point significantly less that that of stainless steel, yet still avoid the effects of cold welding or galling. More specifically, the use of hypoeutectic steel and/or steel having Vickers hardness between about 218 HV and about 290 HV ensures that wedge member 30 slides within sleeve element 40 without cold welding or galling. Moreover, by substantially matching material properties of wedge member 30 and sleeve element 40 cold welding and/or galling is further avoided and the cost of the anchor stud is reduced. Finally, in contrast to prior art units, the anchor stud described herein has been shown to meet certification requirements for use in cracked concrete.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

The invention claimed is:
1. An anchor stud comprising:
a stud portion including a body portion having a first end that extends to a second end though an intermediate portion;
a wedge member operatively coupled to the second end of the stud portion, the wedge member including a body having a generally frustoconical profile, the wedge member being formed from a material having a Vickers hardness of between about 218 HV and about 290 HV; and
a sleeve element positioned on the stud portion at the second end adjacent the wedge member, the sleeve element being formed from a material having a Vickers of at least 245 HV up to about 290 HV.

2. The anchor stud according to claim 1, wherein the wedge member is formed from a material having a Vickers hardness of about 290 HV.

3. The anchor stud according to claim 1, wherein the sleeve element is formed from a material having a Vickers hardness distinct from the Vickers hardness of the material forming the wedge member.

4. The anchor stud according to claim 1, wherein the sleeve element is formed from a material having a Vickers hardness substantially identical to the Vickers hardness of the material forming the wedge member.

5. The anchor stud according to claim 1, wherein the Vickers hardness is measured to a depth of between about 0.005 inches (0.127 mm) and about 0.025 inches (0.635 mm).

6. The anchor stud according to claim 1, wherein the wedge member is formed from a hypoeutectic steel.

7. The anchor stud according to claim 6, wherein the wedge member is formed from a medium carbon steel.

8. The anchor stud according to claim 6, wherein the medium carbon steel is between about a 1030 steel and about a 1060 steel.

9. The anchor stud according to claim 1, wherein the sleeve element is formed from a hypoeutectic steel.

10. The anchor stud according to claim 8, wherein the sleeve element is formed from a medium carbon steel.

11. The anchor stud according to claim 10, wherein the medium carbon steel is between about a 1030 steel and a 1060 steel.

12. The anchor stud according to claim 1, wherein the sleeve element is formed from martensite steel.

13. The anchor stud according to claim 12, wherein the sleeve element is formed from pre-hardened martensite steel.

14. An anchor stud comprising:
a stud portion including a body portion having a first end that extends to a second end though an intermediate portion;
a wedge member operatively coupled to the second end of the stud portion, the wedge member including a body being formed from a first hypoeutectic steel having a Vickers hardness of between about 218 HV and about 290 HV; and
a sleeve element positioned on the stud portion at the second end adjacent the wedge member, the sleeve element being formed from a second hypoeutectic steel that is substantially identical to the first hypoeutectic steel, the second hypoeutectic steel having a Vickers hardness of between about 218 HV and about 290 HV.

15. The anchor stud according to claim 14, wherein the sleeve element has a Vickers hardness substantially identical to the Vickers hardness of the wedge member.

16. The anchor stud according to claim 15, wherein the Vickers hardness of the wedge member is measured to a depth of between about 0.005 inches (0.127 mm) and about 0.025 inches (0.635 mm).

17. The anchor stud according to claim 16, wherein the Vickers hardness of the sleeve element is measured to a depth of between about 0.005 inches (0.127 mm) and about 0.025 inches (0.635 mm).

18. The anchor stud according to claim 14, wherein the sleeve element is formed from martensite steel.

19. The anchor stud according to claim 18, wherein the sleeve element is formed from pre-hardened martensite steel.

20. The anchor stud according to claim 14, wherein the first hypoeutectic steel forming the wedge member includes a medium carbon steel between about a 1030 steel and a 1060 steel.

21. The anchor stud according to claim 14, wherein the second hypoeutectic steel forming the sleeve element includes a medium carbon steel between about a 1030 steel and a 1060 steel.

22. A method of forming an anchor stud, the method comprising:
forming a stud portion including a body portion having a first end that extends to a second end though an intermediate portion;
providing a wedge member formed from a first hypoeutectic steel having a Vickers hardness of between about 218 HV and about 290 HV at the second end of the stud portion; and
attaching a sleeve element to the stud portion at the second end portion adjacent the wedge member, the sleeve element formed from a second hypoeutectic steel that is substantially identical to the first hypoeutectic steel, the second hypoeutectic steel having a Vickers hardness of between about 218 HV and about 290 HV.

23. The method of claim 22, wherein at least one of the first hypoeutectic steel forming the wedge member and the second hypoeutectic steel forming the sleeve element includes a medium carbon steel between about a 1030 steel and a 1060 steel.

24. The method of claim 22, wherein the sleeve element has a Vickers hardness substantially identical to the Vickers hardness of the wedge member.

* * * * *